(12) United States Patent
Dorrance et al.

(10) Patent No.: US 6,799,166 B2
(45) Date of Patent: Sep. 28, 2004

(54) METHOD AND APPARATUS FOR PREVENTING DUPLICATE TRANSACTIONS ON BATCH MODE FAILURE RECOVERY IN A DATA PROCESSING SYSTEM

(75) Inventors: Daniel Michael Dorrance, Round Rock, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/456,720

(22) Filed: Jun. 6, 2003

(65) Prior Publication Data

US 2003/0212573 A1 Nov. 13, 2003

Related U.S. Application Data

(63) Continuation of application No. 09/389,193, filed on Sep. 2, 1999, now abandoned.

(51) Int. Cl.[7] .......................... G06F 17/30; G06F 15/16
(52) U.S. Cl. .......................... 705/35; 707/202; 709/200
(58) Field of Search ................. 707/202, 201, 707/10, 200; 709/101, 103, 200; 705/39, 35

(56) References Cited

U.S. PATENT DOCUMENTS

| | | | |
|---|---|---|---|
| 4,727,243 A | 2/1988 | Savar | 235/379 |
| 4,949,251 A | 8/1990 | Griffin et al. | |
| 5,115,392 A | 5/1992 | Takamoto et al. | 709/101 |
| 5,258,908 A | 11/1993 | Hartheimer et al. | 364/408 |
| 5,745,886 A * | 4/1998 | Rosen | 705/39 |
| 5,842,211 A | 11/1998 | Horadan et al. | 707/10 |
| 5,856,972 A | 1/1999 | Riley et al. | 370/389 |
| 5,870,722 A | 2/1999 | Albert et al. | 705/39 |
| 5,878,215 A | 3/1999 | Kling et al. | 395/200.37 |
| 5,918,216 A | 6/1999 | Miksovsky et al. | 705/35 |
| 6,233,565 B1 * | 5/2001 | Lewis et al. | 705/35 |
| 6,237,035 B1 | 5/2001 | Himmel et al. | 709/224 |
| 6,434,710 B1 | 8/2002 | Sato et al. | 714/2 |
| 6,446,048 B1 * | 9/2002 | Wells et al. | 705/35 |
| 6,513,019 B2 * | 1/2003 | Lewis | 705/35 |

OTHER PUBLICATIONS

Kataoka et al., A Multiversion Concurrency Control Algorithm for Concurrent Execution of Partial Update and Bulk Retrieval Transactions, Computers and Communications. Conf. Proceedings, Tenth Annual Inter. Phoenix Conf. on, Mar. 27–30, 1991, pp. 130–136.*

* cited by examiner

*Primary Examiner*—Greta Robinson
(74) *Attorney, Agent, or Firm*—Duke W. Yee; David A. Nims, Jr.; Lisa L. B. Yociss (57) ABSTRACT

A method and apparatus for processing electronic transactions. A batch request is received, wherein the batch request includes a plurality of electronic transactions. A determination is then made as to whether the batch request has been processed. Responsive to a determination that a portion of the batch request has been processed, the plurality of electronic transactions is sent for processing. Responsive to a determination that a portion of the batch request has been processed, a signal is sent indicating a check for duplicate electronic transactions should be made with respect to the plurality of electronic transactions.

18 Claims, 7 Drawing Sheets

OFXHEADER:100
DATA:OFXSGML
VERSION:102
SECURITY:NONE
ENCODING:USASCII
CHARSET:1252
COMPRESSION:NONE
504 — OLDFILEUID:BBBBBB
502 — NEWFILEUID:AAAAAAAAAA

FIG. 5
500

<!--Tests USERID sign-on, tests STMTRQ for installment account-->
<!--include transactions, INCLUDE=Y, include start date-->

<OFX>
<SIGNONMSGSRQV1>
<SONRQ>
<DTCLIENT>19980415135252
<USERID>ARF1006
<USERPASS>1006
<GENUSERKEY>N
<LANGUAGE>ENG
<APPID>QWIN
<APPVER>0700
</SONRQ>
</SIGNONMSGSRQV1>

<BANKMSGSRQV1>
<STMTTRNRQ>
<TRNUID>9810515-15135252-5515-20592
<STMTRQ>
<BANKACCTFROM>
<BANKID>100010000
<ACCTID>ARF1006ILA1
<ACCTTYPE>SAVINGS
</BANKACCTFROM>
<INCTRAN>
<DTSTART>19961101
<INCLUDE>Y
</INCTRAN>
</STMTRQ>
</STMTTRNRQ>
</BANKMSGSRQV1>
</OFX>

```
<OFX>
    ...
    <INTRASYNCRQ>
        <TOKEN>xxxxx
        <TOKENONLY>xxxxxx
        <REFRESH>xxxxx
        <REJECTIFMISSING>xxxx
        <BANKACCTFROM>
            <BANKID>xxxxxx
            <BRANCHID>xxxxxx
            <ACCTID>xxxxx
            <ACCTTYPE>xxxxx
            <ACCTKEY>xxxxx
        </BANKACCTFROM>

<INTRATRNRQ>
            <TRNUID>xxxxx
            <CLTCOOKIE>xxxxxx
            <TAN>xxxxx
            <INTRAMODRQ>
                <SRVRTID>xxxxx
                <XFERINFO>
                    <BANKACCTFROM>
                        <BANKID>xxxxxx
                        <BRANCHID>xxxxx
                        <ACCTID>xxxxxx
                        <ACCTTYPE>xxxxx
                        <ACCTKEY>xxxxxx
                    </BANKACCTFROM>
                    <CCACCTTO>
                        <ACCTID>xxxxx
                        <ACCTKEY>xxxxx
                    </CCACCTTO>
                    <TRNAMT>xxxxxx
                    <DTDUE>xxxxxx
                </XFERINFO>
            </INTRAMODRQ>
        </INTRATRNRQ>

</INTRATRNRQ>
            <TRNUID>xxxxx
            <CLTCOOKIE>xxxxxx
            <TAN>xxxxx
            <INTRACANRQ>
                <SRVRTID>xxxxx
            </INTRACANRQ>
        </INTRATRNRQ>
    <INTRASYNCRQ>
</OFX>
```

FIG. 6
600

602 → CHNG_VAR_TFR_TXN

604 → DEL_VAR_TFR_TXN

METHOD AND APPARATUS FOR PREVENTING DUPLICATE TRANSACTIONS ON BATCH MODE FAILURE RECOVERY IN A DATA PROCESSING SYSTEM

This application is a continuation of application Ser. No. 09/389,193, filed Sep. 2, 1999 now abandoned.

BACKGROUND OF THE INVENTION

1. Technical Field

The present invention relates generally to an improved data processing system and, in particular, to a method and apparatus for processing transactions. Still more particularly, the present invention relates to a method and apparatus for preventing duplicate transactions from occurring in a data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). Retrieval of information, such as Webpages, on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Further, The Internet is increasingly being used for electronic commerce, also referred to as "e-commerce." One example of this use is for financial transactions between consumers and financial institutions. Programs, such as Quicken and MSMoney, are used by consumers to communicate financial transactions to banks and other financial institutions. Quicken is a registered trademark of Intuit, Inc., located in Mountain View, Calif. while MSMoney is a trademark of Microsoft Corporation, located in Redmond, Wash. Consumers use these programs to perform various transactions, such as, for example, balance inquiry, bill payment, transfers, and account ledgers. The protocol used by Quicken and MS Money is open financial exchange (OFX). Open financial exchange is a specification for the electronic change of financial data between financial institutions, businesses, and consumers via the Internet. This protocol was created by CheckFree Intuit, and Microsoft in early 1997. More information on OFX may be found at: www.ofx.net. A number of banks belong to Integrion Financial Network, which is a consortium consisting of banks, such as Bank of America, Citibank, Comerica and Bank One, and including International Business Machines Corporation. These banks, however, use a different protocol from Quicken and MSMoney. The protocol is called the "Gold standard" (also referred to as "Gold"). Gold is independent of operating systems, programming language, and communications/messaging software. The standard is directed towards financial institutions. More information on the Integrion Financial Network, the owners, and the Gold standard may be found at: www.integrion.com. Additionally, Integrion banks normally do not use OFX for transactions.

Therefore, it would be advantageous to have an improved method and apparatus for handling transactions between two different protocols.

SUMMARY OF THE INVENTION

The present invention provides a method and apparatus for processing electronic transactions. A batch request is received from a client. The batch request includes a plurality of electronic transactions. A determination is then made as to whether the batch request has been processed. Responsive to a determination that a portion of the batch request has been processed, the electronic transactions are sent for processing. Responsive to a determination that a portion of the batch request has been processed, a signal is sent indicating a check for duplicate electronic transactions should be made with respect to the electronic transactions. Responsive to a determination that the batch request is unprocessed, the electronic transactions are sent for processing. An indication is received each time an electronic transaction from the plurality of electronic transactions is processed. Responsive to receiving an indication of all of the electronic transactions, a response is sent to the client indicating that the batch request has been processed.

BRIEF DESCRIPTION OF THE DRAWINGS

The novel features believed characteristic of the invention are set forth in the appended claims. The invention itself, however, as well as, a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
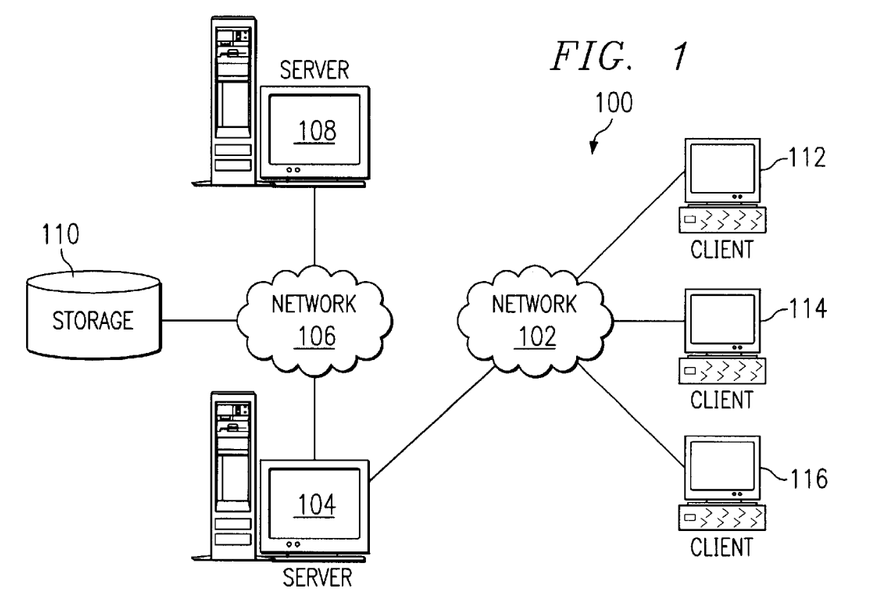
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 and network 106. In the depicted example, network 102 is the Internet and represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Network 106 in this example is a local area network. Server 108 and storage device 110 have a connection to network 106. In this example, clients 112, 114, and 116 are connected to network 102 and may access services from server 104 and server 108 through networks 102 and 106. These clients are, for example, personal computers or network computers.

In these examples, the processes of the present invention are illustrated relative to a user at a client communicating financial transactions to a financial institution in which the financial institution uses servers 104 and 108 to provide services to clients. In this example, server 104 is a bank Internet server, while server 108 is a bank mainframe or other back end processor computer system. In these examples, the conversion protocols of the present invention may be implemented within server 104 to convert transactions received in a data stream in one protocol into transactions for a data stream in another protocol. In particular, the depicted examples are directed towards receiving financial transactions using Open Financial Exchange (OFX) and converting those transactions to a Gold message standard protocol and sending those transactions in a data stream to server 108 via network 106.

Server 104 is the server in which these conversion processes are implemented in accordance with a preferred embodiment of the present invention. These processes, however, may be located in other places in distributed data processing system 100. For example, the processes actually could be implemented in server 108 to convert the data stream at the receiving server. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
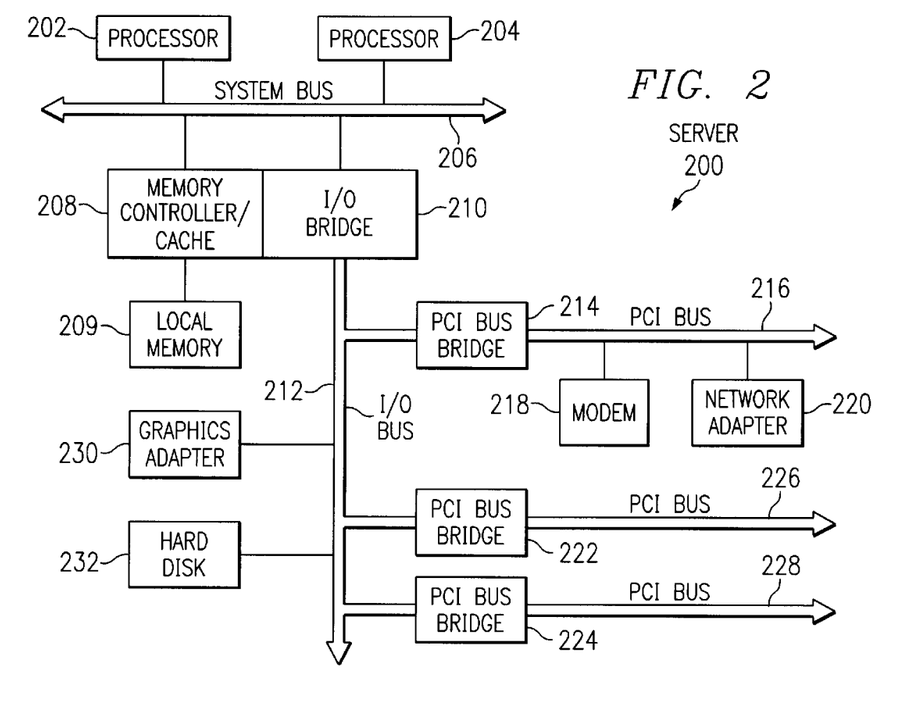
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 or server 108 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figures 3, 4:
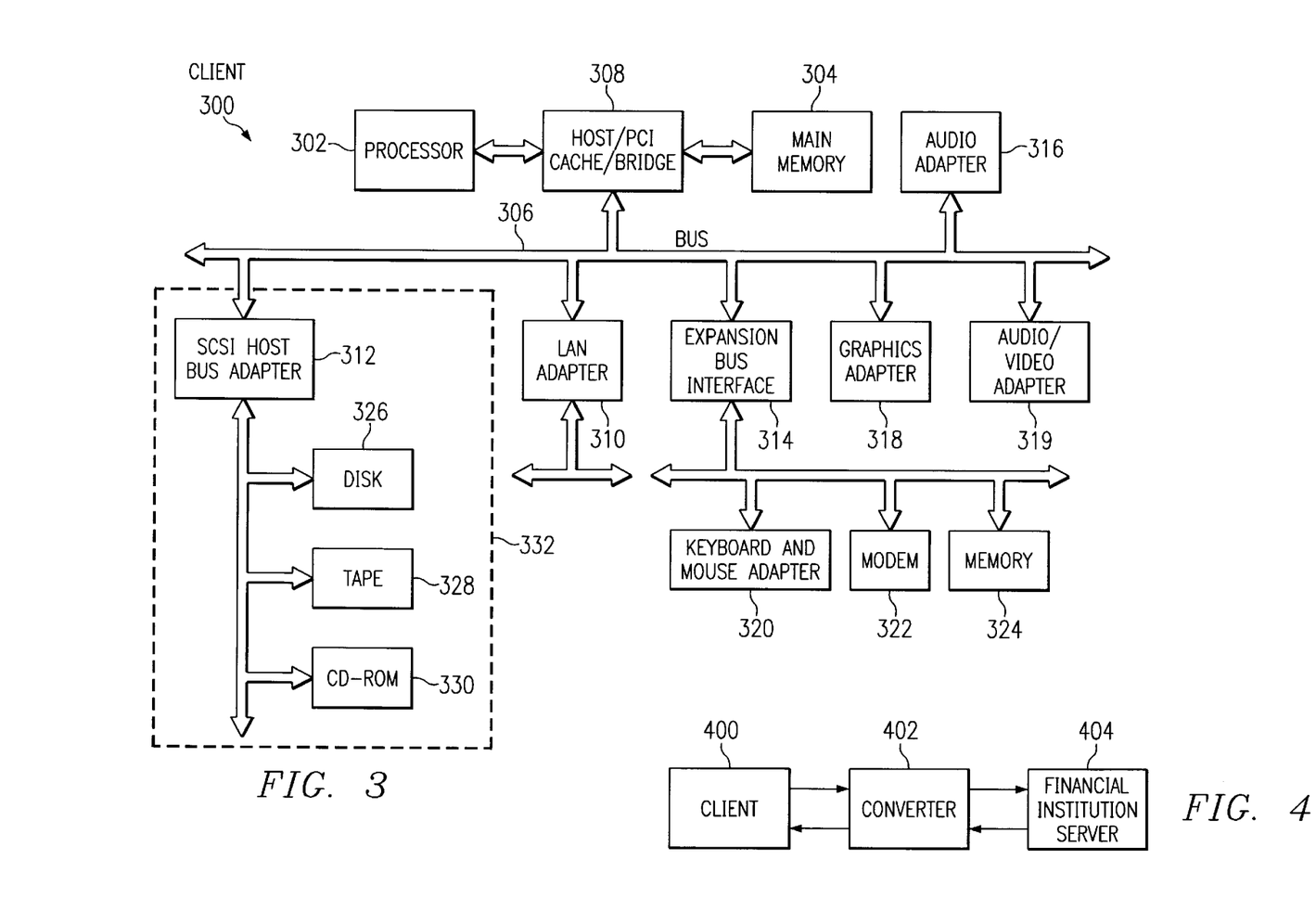
FIG. 3 is a block diagram illustrating a data processing system in which the present invention may be implemented.
FIG. 4 is a block diagram illustrating software components used for processing transactions depicted in accordance with a preferred embodiment of the present invention.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture(ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection.

In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Data processing systems, such as data processing system 300 are often used to send financial transactions to a financial institution. Sometimes, the protocol used by client processes differ from those at the financial institution. The difference between Open Financial Exchange and Gold is that in Open Financial Exchange, the entire set of transactions for a user session are bundled into one batch transmission by the client and sent to the financial institution. At the transmission level, the client only knows whether it received a good response to the last batch request sent to the financial institution. Each time the process at the client prepares to send a new batch of transactions, the process checks to see if the last batch sent was completed. If the last batch was not sent, the last batch request is re-sent.

Several possible failure situations exist in which the last batch was not completed and would result in an absence of a batch response being received by the client from the financial institution. One situation is that the request was never received by the server. Another is that the server died or failed prior to completing processing of the request by the clients. Another possible situation is the response was sent by the server but was not received by the client.

At a batch level, servers following Open Financial Exchange are expected to save batch responses returned to the client. Such a server checks each request by a unique ID attached to it by the client to see if the request has been processed. If the batch has been processed, the saved batch will be returned. The client assumes that the entire batch was either completed or uncompleted at the server. The client does not take into account the possibility that some of the transactions in the batch were completed while other transactions remain uncompleted. On the other hand, Gold is a single transaction protocol, rather than a batch transaction protocol like Open Financial Exchange.

The present invention provides a method, apparatus, and computer implemented instructions for converting from one protocol to another protocol in a manner such that error processing between the two protocols may occur. More specifically, the protocol converter mechanism of the present invention breaks apart a batch request from a client and converts it into discreet transactions. The mechanism of the present invention sends out these discreet transactions one transaction at a time. This mechanism provides an error checking process to take into account the possibility that a batch request from a client may only be partially processed at the financial institution.

A problem with the Open Financial Exchange protocol is that this protocol assumes that the entire batch was processed or not processed without any other options. This protocol does not take into account the possibility that processing of a batch was begun, but never completed. Such a situation poses a problem with financial institutions using a single transaction protocol, such as Gold.

For example, a batch request is sent from a client to a financial institution in which the batch request contains ten bill payment requests. Assume that five of the ten bill payment requests were processed and the server failed without processing the remaining five requests. The mechanism of the present invention recognizes that the client would never receive a response to the batch request. The next time the client tries to perform an action, the client process would realize that the batch request should be re-sent with the ten bill payments request. With current existing Open Financial Exchange error recovery processes, the server at the financial institution would check the batch ID and see that a response was not saved because the server had failed half way through the process and never sent back a response to the request. Thus, the request from the client would appear to be a new batch request and would be processed as such. As a result, all ten bill payments would be sent to the financial institution. A problem exists that five of the bill payment requests would be duplicates.

The present invention provides a mechanism to add granularity to the error recovery process for transactions in which a first protocol is a batch request protocol and a second protocol is a single transaction protocol.

With reference now to FIG. 4, a block diagram illustrating software components used for processing transactions is depicted in accordance with a preferred embodiment of the present invention. In this example, client 400 may send a batch request to converter 402. In response to receiving this batch request, converter 402 decomposes or converts the batch request into a series of individual transactions, which are sent to financial institution server 404 for processing. In response to processing these requests, responses are returned to converter 402. When all of the responses for a particular batch have been received by converter 402, converter 402 will then return a response to client 400 to indicate that the batch request has been processed. Additionally, if for some reason some of the transactions were not processed by financial institution server 404, converter 402 will not return a response to client 400. In response to client 400 sending the same batch request to converter 402, converter 402 will convert the request into a set of individual requests and send those requests to financial institution server 404. In addition, converter 402 also will send an indicator or a signal to financial institution server 404 to search for duplicate transactions. In the depicted examples, converter 402 is located on a server, such as server 104 in FIG. 1 while financial institution server 404 is located on a server, such as server 108 in FIG. 1. Of course, the processes from these two components may be located on the same computer or server depending on the implementation.

The mechanism of the present invention saves responses by a unique ID for every Gold transaction as well as every Open Financial Exchange batch request. In such a situation, when a batch request is received for the additional ten bill payments, the processes of the present invention would identify that five of the ten bill payments had already been processed. The mechanism of the present invention would now resubmit those transactions to the financial institution.

Additionally, due to the additional granularity, the number of transactions and the amount of history that is kept and scanned are much larger than with Open Financial Exchange. Additionally, it is undesirable to check for duplicates on each transaction. As a result, the mechanism of the present invention receives a new batch request and determines whether the batch request is a new batch request. If the batch request is a new batch request, the batch ID is logged in a file or other data structure. Then an indication is made that the batch processing has started. Once a response has been created to the batch request for return, the response is stored and the indication associated with the batch ID is changed to indicate that the processing has been completed.

As a result, each time a new batch request is received, the batch ID is checked with that new file. Three possible states exist for the ID in the depicted examples. One state is that the ID does not exist and is a new batch. Another state is that the batch ID exists and was completed. In this case, the restored response is retrieved and returned to the client. A third state is that the batch request was started and never completed. In such a case, a potential for duplicates is present and in this state, the duplicate checking is turned on for each transaction sent to the financial institution.

Figure 5:
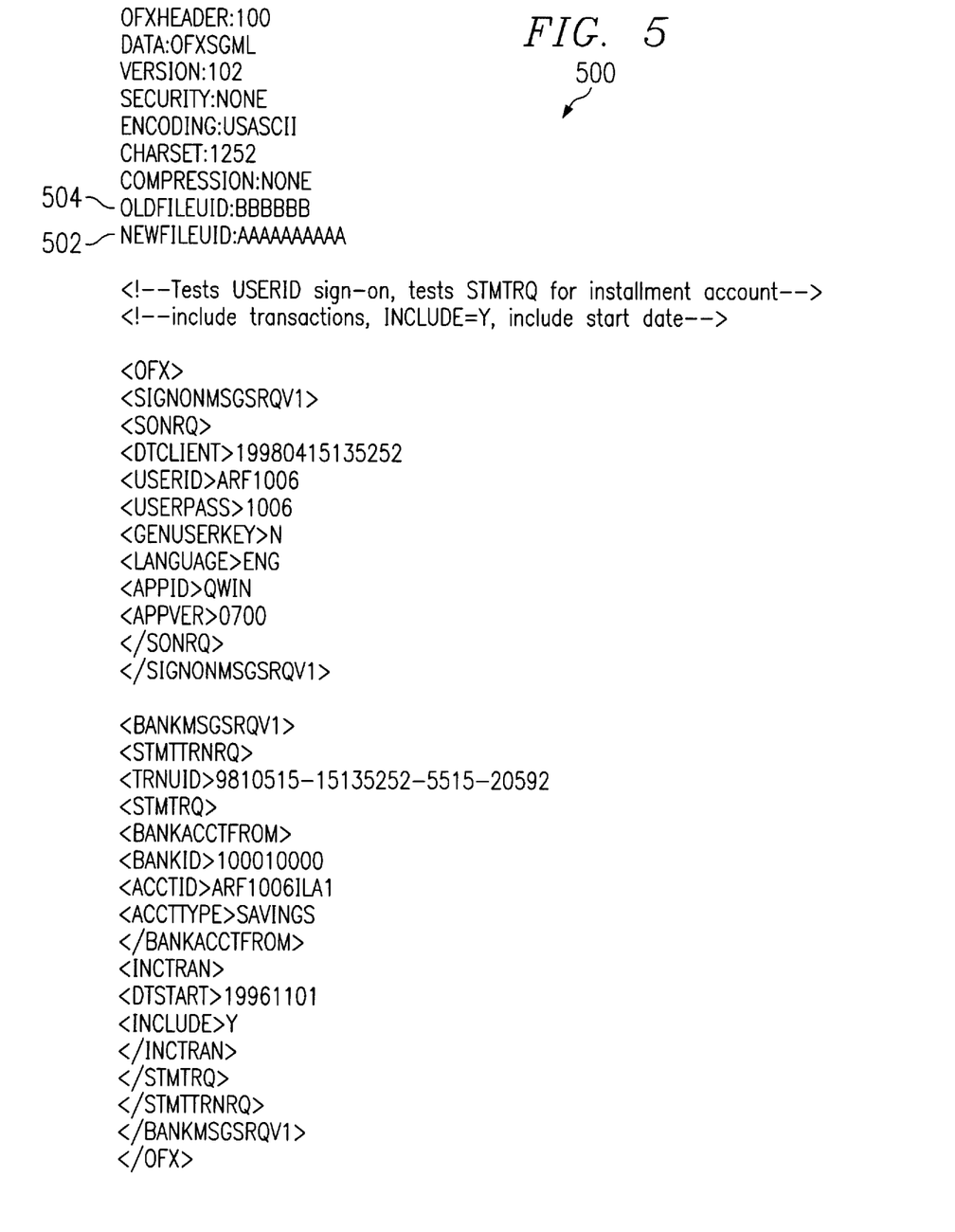
FIG. 5 is a diagram illustrating an Open Financial Exchange batch request depicted in accordance with a preferred embodiment of the present invention.

Turning now to FIG. 5, a diagram illustrating an Open Financial Exchange batch request is depicted in accordance with a preferred embodiment of the present invention. Batch request 500 is a standard generalized markup language (SGML) based protocol. These requests are text based using tags similar to HTML. The newfileuid 502 contains the batch ID. OldFileuid 504 is an acknowledgement that the client has received and processed the specified batch implying that the server may clean the batch out of its archive. The remaining portions of the file contain instructions and data for actual transactions. Gold is a binary structure based protocol. In this protocol, a programmer fills out C structures for a transaction, such as a funds transfer request. An API is then called to package the data into a packed protocol. At the receiving end, the package is unpacked and the data and C structures are used to process the transaction.

Figure 6:
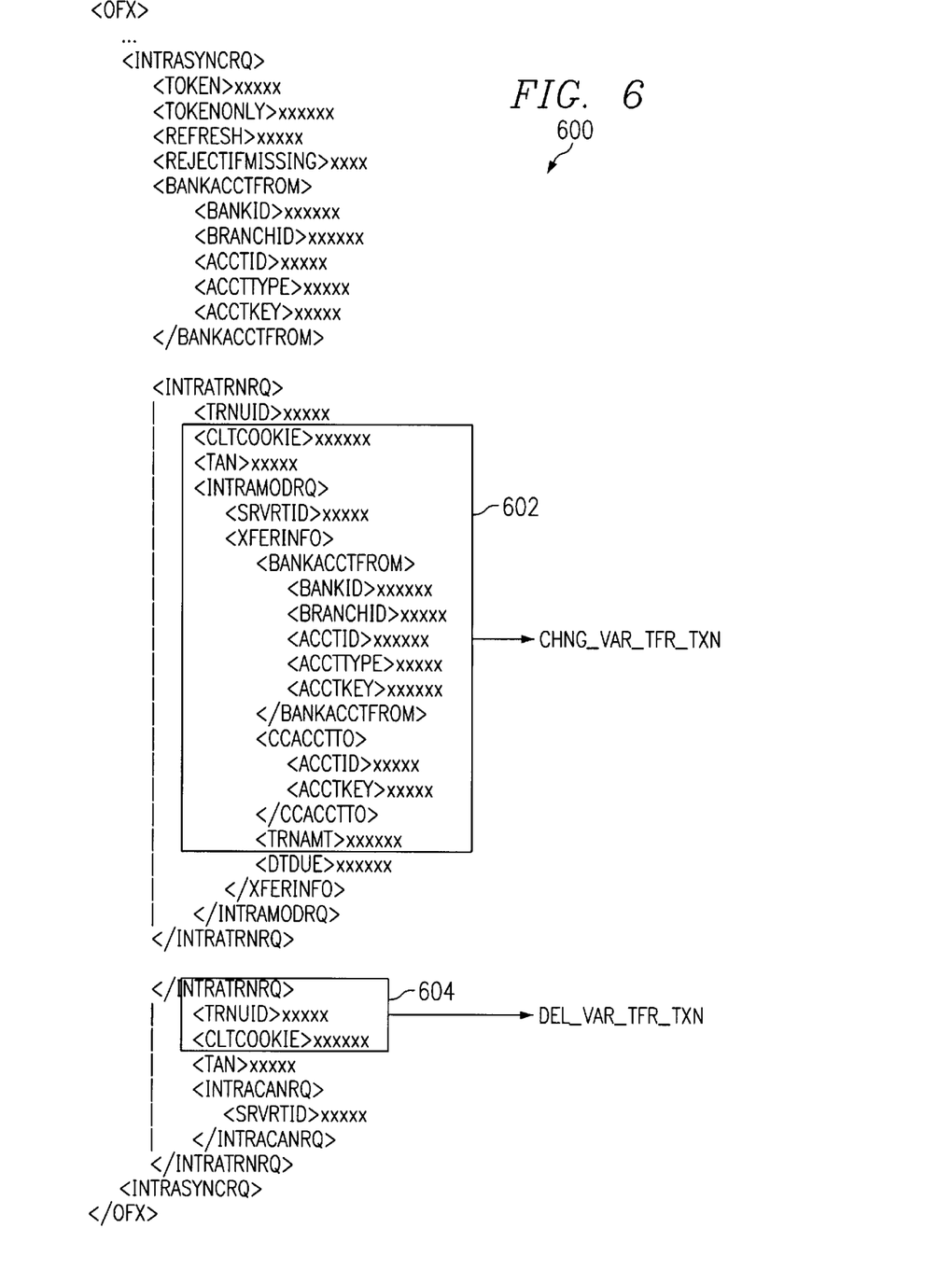
FIG. 6 is a diagram illustrating transactions within a batch request depicted in accordance with a preferred embodiment of the present invention.

With reference now to FIG. 6, a diagram illustrating transactions within a batch request is depicted in accordance with a preferred embodiment of the present invention. Batch request 600 is an example of an open financial exchange request. This batch request includes different transactions, which may be used to generate transactions for Gold protocol transactions. In some cases, one batch request may map into multiple transactions or no transactions at all. For example, batch request 600 includes a transaction 602 and a transaction 604, which would be converted into two individual transactions in Gold. In FIG. 6, only two transactions, transactions 602 and 604, have been shown for purposes of illustration. Batch request 600 includes other open financial exchange transactions that may be mapped into transactions in Gold.

Figure 7:
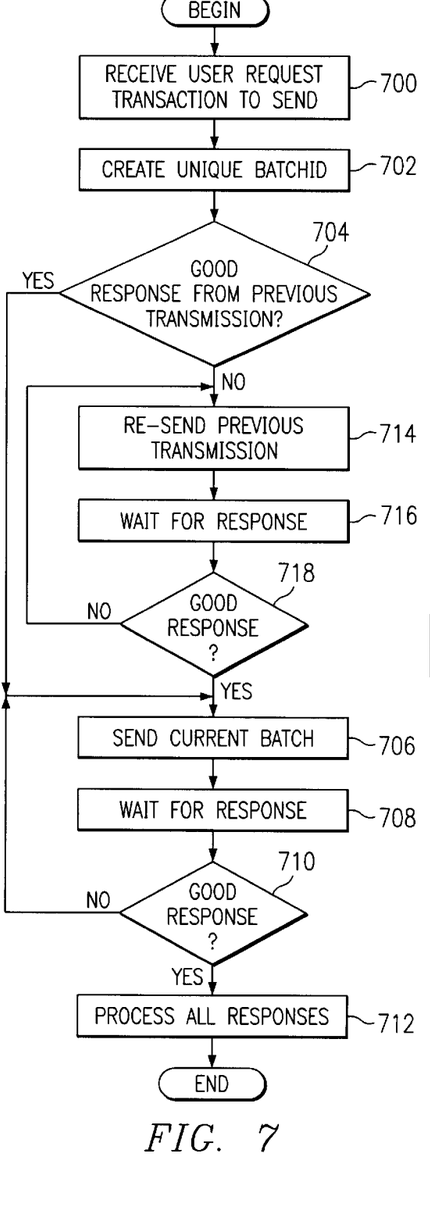
FIG. 7 is a flowchart of a process used on a client machine depicted in accordance with a preferred embodiment of the present invention.

With reference now to FIG. 7, a flowchart of a process used on a client machine is depicted in accordance with a preferred embodiment of the present invention. The processes is illustrated in FIG. 7, are those typically used in a program or application, such as Quicken, using Open Financial Exchange as a protocol.

The process begins by receiving a user request to send data to a target (step 700). In the depicted examples, the request is a set of financial transactions to send to a financial institution. Thereafter, a unique batch ID is created for the request (step 702). A determination is made as to whether a completed or good response has been received for the previous transmission sent (step 704). If a good response was received from the previous transmission, then the current batch request is sent (step 706). The process waits for a response for a selected period of time (step 708). A determination is made as to whether a good response has been received (step 710). If a good response is not received, the process returns to step 706. Otherwise, all of the responses received are processed (step 712), with the processes terminating thereafter.

With reference again to step 704, if a good response has not been received for the previous transmission, the previous batch request is re-sent (step 714). Thereafter, the process waits for a response (step 716). A determination is made as to whether the response is a good response (step 718). If the response is not a good response, the process returns to step 714. Otherwise, the process proceeds to step 706 as described above.

Figure 8:
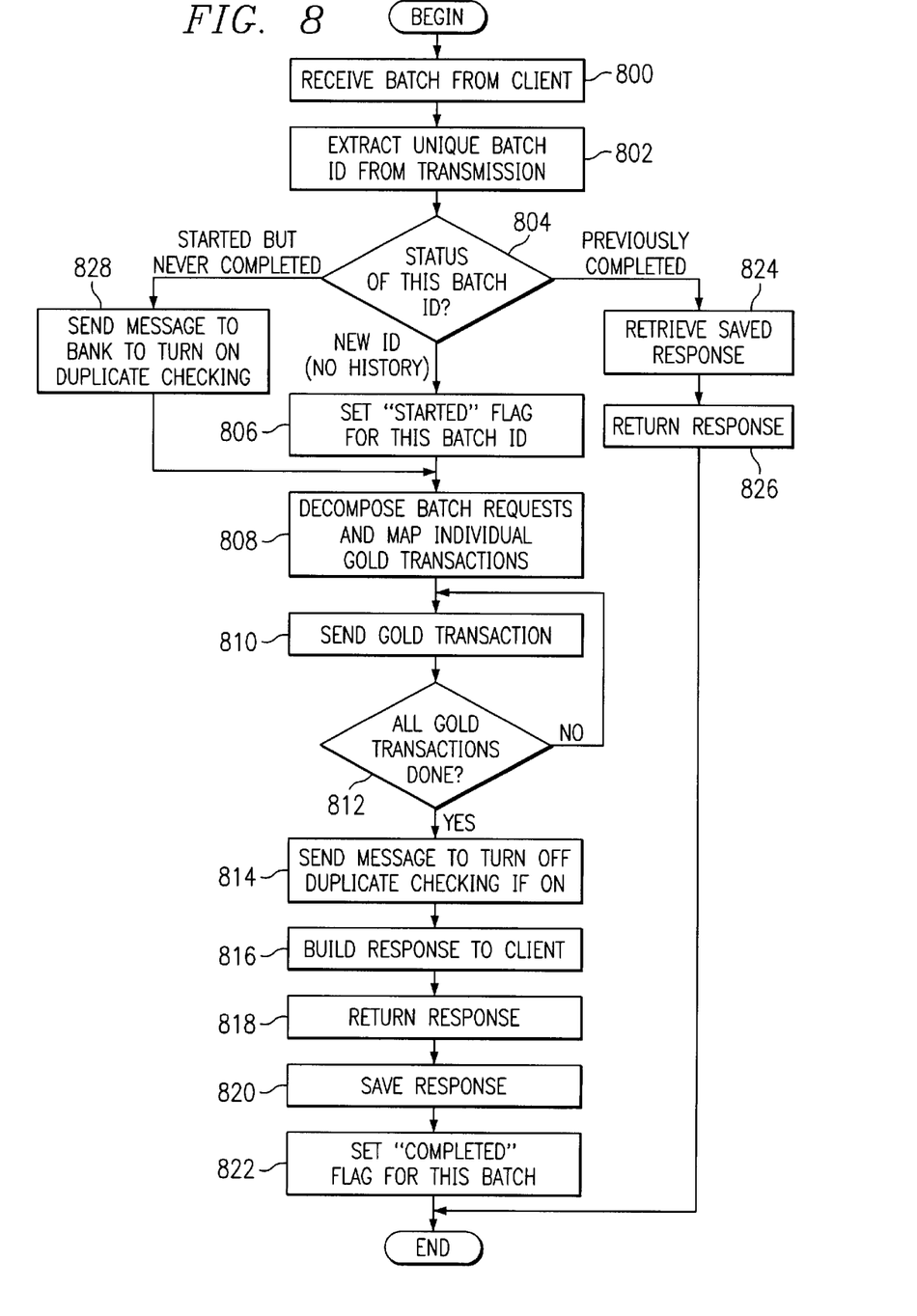
FIG. 8 is a flowchart of a process for converting transactions from one protocol to another protocol depicted in accordance with a preferred embodiment of the present invention.

With reference now to FIG. 8, a flowchart of a process for converting transactions from one protocol to another protocol is depicted in accordance with a preferred embodiment of the present invention. The processes illustrated in FIG. 8 may be implemented in a server, such as server 104 in FIG. 1. These processes are used to convert requests received in a batch format to those in a singular transaction format. In addition, these processes also are used to provide an error recovery mechanism between the two protocols.

The process begins by receiving a batch request from the client (step 800). A unique batch ID is extracted from the request (step 802). A status of the batch ID is determined (step 804). This status is determined by comparing the batch ID to a file containing other batch ID's in which indications or status states are associated with the batch ID's. If a determination is made that the batch ID is a new batch ID, a "started" flag is set or associated with the batch ID (step 806). Thereafter, the batch request is decomposed and mapped into individual transactions (step 808).

Thereafter, a transaction is sent (step 810). A determination is made as to whether all of the transactions for the batch have been sent (step 812). If all of the transactions have not been sent, the process returns to step 810. Otherwise, a message is sent to turn off duplicate checking if such a mechanism has been turned on at the server (step 814). Thereafter, a response is built to return to the client (step 816). The response is then returned (step 818). The response is also saved (step 820). Finally, a completed flag is set or associated for the particular batch ID (step 822) with the process terminating thereafter.

With reference again to step 804, if the status of the batch ID indicates that the batch was previously completed, the saved response is retrieved (step 824). Thereafter, this response is returned to the client (step 826) with the process terminating thereafter.

With reference again to step 804, if the status of the batch ID is that the batch processing was started but never completed, a message is sent to the server to turn on the duplicate checking mechanism (step 828) with the process returning to step 808 thereafter.

Figure 9:
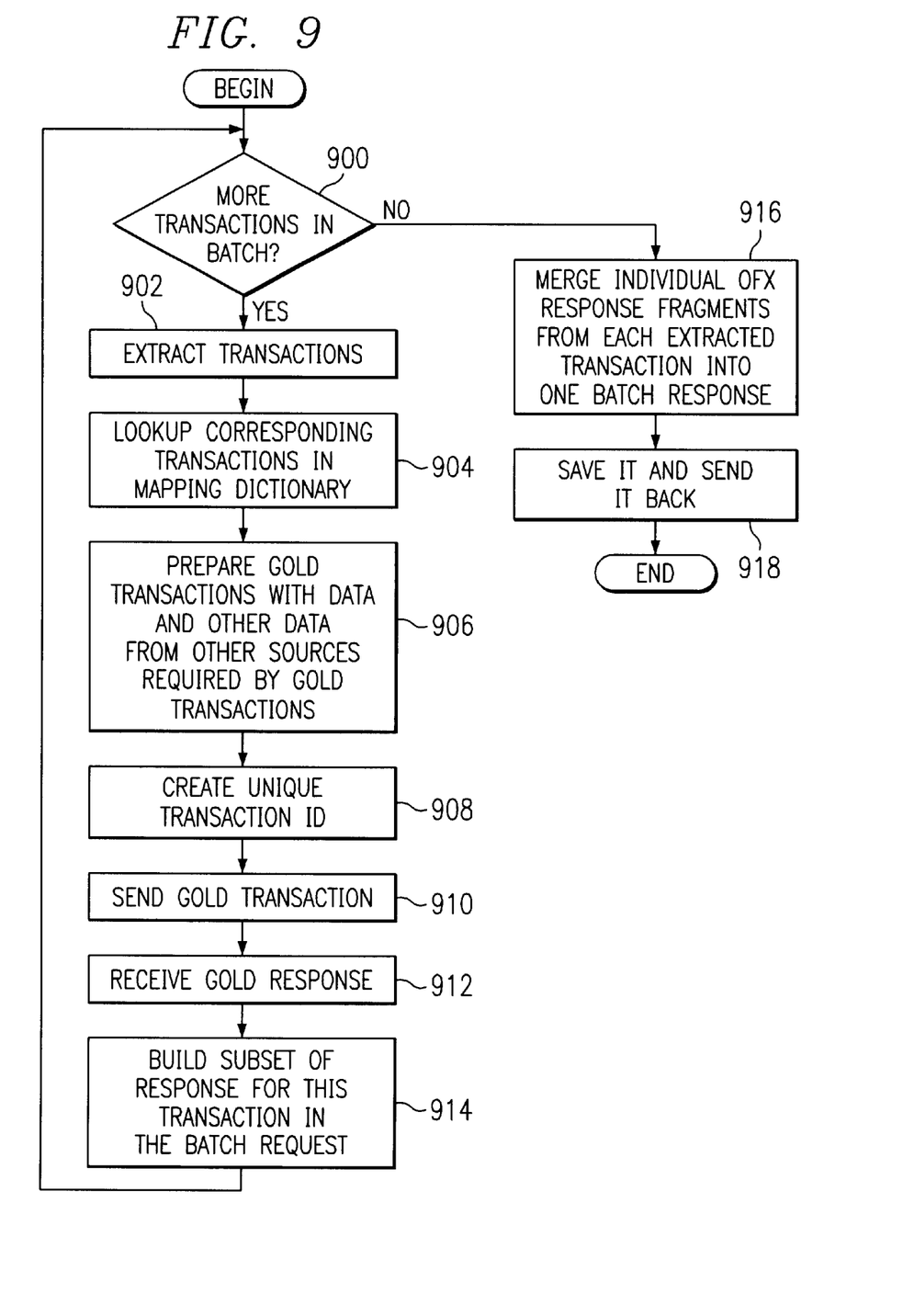
FIG. 9 is a flowchart of a process for decomposing batch requests and mapping them to individual transactions depicted in accordance with a preferred embodiment of the present invention.

With reference now to FIG. 9, a flowchart of a process for decomposing batch requests and mapping them to individual transactions is depicted in accordance with a preferred embodiment of the present invention. The process illustrated in FIG. 9 is a more detailed description of step 808 in FIG. 8. In the depicted examples, the batch request is an OFX request, which is decomposed into one or more Gold transactions.

The process begins by determining whether more transactions are present in the batch request (step 900). If more transactions are present, a transaction is extracted for processing from the batch request (step 902). The process looks at corresponding transaction in the mapping dictionary (step 904). Thereafter, a Gold transaction is prepared with the data from the batch request and from data required to be placed in the Gold transaction (step 906). Thereafter, a unique ID is created for the transaction (step 908). The Gold transaction is then sent (step 910). A response is received (step 912). In the depicted examples, the response may be good, bad, or time out. A subset of a batch request response is created for this transaction extracted from the batch (step 914) with the process then returning to step 900. Step 914 gathers responses for Gold transactions created from transactions extracted from the batch request. This step also creates a subset or fragment of the appropriate OFX response that corresponds to the fragment being processed.

With reference again to step 900, if additional transactions are not present in the batch request, the process then merges the OFX response fragments from step 914 into a single batch response (step 916). Thereafter, the process sends the response to the client (step 918) with the process terminating thereafter.

Figure 10:
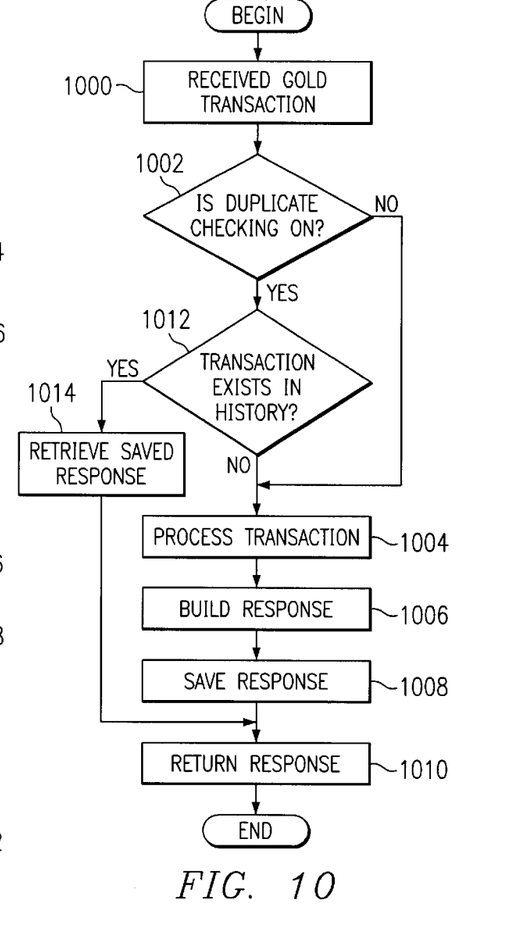
FIG. 10 is a flowchart of a process used at a server to process transactions depicted in accordance with a preferred embodiment of the present invention.

With reference now to FIG. 10, a flowchart of a process used at a server to process transactions is depicted in accordance with a preferred embodiment of the present invention. The processes illustrated in FIG. 10 may be implemented in a server, such as, for example, server 108 in FIG. 1.

The process begins by receiving a transaction for processing (step 1000). Thereafter, a determination is made as to whether duplicate checking has been turned on (step 1002). If duplicate checking has not been turned on, the transaction is processed (step 1004). The processing of the transaction includes, for example, the payment of bills by the customer, a request for a ledger, or a request for a balance. A response is then built after the transaction has been processed (step 1006). The response is saved (step 1008). The response is then returned (step 1010) with the process terminating thereafter. In this example, the response is returned to the converter mechanism of the present invention.

With reference again to step 1002, if duplicate checking is turned on, then a determination is made as to whether the transaction is present in the history (step 1012). If the transaction is not present, the process then returns to step 1004. Otherwise, the saved response is retrieved (step 1014) with the process then proceeding to step 1010 as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment illustrates conversion from OFX to Gold, the processes of the present invention may be applied for error checking in other protocols in which one protocol handles that batch transaction while another protocol handles individual transactions. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing electronic transactions, the method comprising the computer implemented steps of:
    receiving a batch request from a client, wherein the batch request contains a plurality of discrete financial transactions, the batch request and its plurality of discrete financial transactions adhering to a first financial transaction protocol;
    converting the batch request into a plurality of single electronic financial transactions, each one of said plurality of electronic financial transaction adhering to a second financial transaction protocol, wherein a conversion is executed from said first financial transaction protocol to said second financial transaction protocol, said first financial transaction protocol being a batch request protocol and said second financial transaction protocol being a single transaction protocol;

determining a processing status of the batch request; and responsive to a determination that processing of the batch request was previously started but not completed:

sending the plurality of electronic transactions for processing; and sending a signal indicating that a check for duplicate electronic transactions should be made with respect to the plurality of electronic transactions in order to prevent duplicate processing of any electronic transaction in the plurality that was previously processed.

2. The method according to claim 1, further comprising:

receiving said batch request within a conversion service;

converting the batch request into the plurality of single electronic financial transactions utilizing said conversion service;

sending the plurality of electronic transactions from the conversion service to a server for processing;

sending a signal from the conversion service to the server indicating that the check for duplicate electronic transactions should be made by the server;

checking, by the server, each one of the plurality of single electronic financial transactions to determine if it has already been processed by the server;

in response to a determination by the server that one of the plurality of single electronic financial transactions has already been processed by the server, prohibiting, by the server, re-processing of the one of the plurality of single electronic financial transactions;

retrieving a completion response generated in response to the first processing of the one of the plurality of single electronic financial transactions; and sending the retrieved completion response from the server to the conversion service.

3. The method according to claim 1, further comprising:

receiving a completion response for each processed electronic transaction from the plurality of electronic transactions; and responsive to receiving completion responses for all of the electronic transactions in the plurality of electronic transactions, returning a batch completion response to the client indicating that the batch request has been processed.

4. The method according to claim 1, further comprising:

responsive to a determination that the batch request was previously processed, retrieving a saved batch completion response and returning it to the client, wherein the batch completion response indicates that the batch request has been processed.

5. The method according to claim 1, wherein the step of determining the processing status of the batch request further comprises:

extracting a unique batch identification from the batch request; and comparing the batch identification to a file of other batch identifications of previously processed batch requests.

6. The method according to claim 1, further comprising:

receiving, within a conversion service, an electronic financial transaction that adheres to the OFX financial transaction protocol;

converting, by the conversion service, the OFX protocol transaction into a plurality of separate, single electronic transactions that each adhere to the Gold financial transaction protocol;

sending the plurality of separate Gold protocol transactions from the conversion service to a server for processing by the server; and providing error processing between the OFX protocol and the Gold protocol when processing of said OFX transaction was previously started by the server but aborted prior to completion.

7. A computer program product in a compute readable medium for processing electronic transactions, the computer program product comprising instructions for receiving a batch request from a client, wherein the batch request contains a plurality of discrete financial transactions, the batch request and its plurality of discrete financial transactions adhering to a first financial transaction protocol;

instructions for converting the batch request into a plurality of single electronic financial transactions, each one of said plurality of electronic financial transactions adhering to a second financial transaction protocol, wherein a conversion is executed from said first financial transaction protocol to said second financial transaction protocol, said first financial transaction protocol being a batch request protocol and said second financial transaction protocol being a single transaction protocol;

instructions for determining a processing status of the batch request; and responsive to a determination that processing of the batch request was previously started but not completed:

instructions for sending the plurality of electronic transactions for processing; and instructions for sending a signal indicating that a check for duplicate electronic transactions should be made with respect to the plurality of electronic transactions in order to prevent duplicate processing of any electronic transaction in the plurality that was previously processed.

8. The computer program product according to claim 7, further comprising:

instructions for receiving said batch request within a conversion service;

instructions for converting the batch request into the plurality of single electronic financial transactions utilizing said conversion service;

instructions for sending the plurality of electronic transactions from the conversion service to a server for processing;

instructions for sending a signal from the conversion service to the server indicating that the check for duplicate electronic transactions should be made by the server;

instructions for checking, by the server, each one of the plurality of single electronic financial transactions to determine if it has already been processed by the server;

in response to a determination by the server that one of the plurality of single electronic financial transactions has already been processed by the server, instructions for prohibiting, by the server, re-processing of the one of the plurality of single electronic financial transactions;

instructions for retrieving a completion response generated in response to the first processing of the one of the plurality of single electronic financial transactions; and instructions for sending the retrieved completion response from the server to the conversion service.

9. The computer program product according to claim 7, further comprising:
  instructions for receiving a completion response for each processed electronic transaction from the plurality of electronic transactions; and
  instructions for responsive to receiving completion responses for all of the electronic transactions in the plurality of electronic transactions, returning a batch completion response to the client indicating that the batch request has been processed.

10. The computer program product according to claim 7, further comprising:
  instructions for responsive to a determination that the batch request was previously processed, retrieving a saved batch completion response and returning it to the client, wherein the batch completion response indicates that the batch request has been processed.

11. The computer program product according to claim 7, wherein the step of determining the processing status of the batch request further comprises:
  instructions for extracting a unique batch identification from the batch request; and
  instructions for comparing the batch identification to a file of other batch identifications of previously processed batch requests.

12. The computer program product according to claim 7, further comprising:
  instructions for receiving, within a conversion service, an electronic financial transaction that adheres to the OFX financial transaction protocol;
  instructions for converting, by the conversion service, the OFX protocol transaction into a plurality of separate, single electronic transactions that each adhere to the Gold financial transaction protocol;
  instructions for sending the plurality of separate Gold protocol transactions from the conversion service to a server for processing by the server; and
  instructions for providing error processing between the OFX protocol and the Gold protocol when processing of said OFX transaction was previously started by the server but aborted prior to completion.

13. A system for processing electronic transactions, the system comprising:
  means for receiving a batch request from a client, wherein the batch request contains a plurality of discrete financial transactions, the batch request and its plurality of discrete financial transactions adhering to a first financial transaction protocol;
  converting means for converting the batch request into a plurality of single electronic financial transactions, each one of said plurality of electronic financial transactions adhering to a second financial transaction protocol, wherein a conversion is executed from said first financial transaction protocol to said second financial transaction protocol, said first financial transaction protocol being a batch request protocol and said second financial transaction protocol being a single transaction protocol;
  means for determining a processing status of the batch request; and
  responsive to a determination that processing of the batch request was previously started but not completed:
    means sending the plurality of electronic transactions for processing; and
    means for sending a signal indicating that a check for duplicate electronic transactions should be made with respect to the plurality of electronic transactions in order to prevent duplicate processing of any electronic transaction in the plurality that was previously processed.

14. The system according to claim 13, further comprising:
  a conversion service for receiving said batch request;
  said conversion service for converting the batch request into the plurality of single electronic financial transactions;
  said conversion service for sending the plurality of electronic transactions from the conversion service to a server for processing;
  said conversion service for sending a signal from the conversion service to the server indicating that the check for duplicate electronic transactions should be made by the server;
  the server for checking each one of the plurality of single electronic financial transactions to determine if it has already been processed by the server;
  in response to a determination by the server that one of the plurality of single electronic financial transactions has already been processed by the server, the server for prohibiting re-processing of the one of the plurality of single electronic financial transactions;
  said server for retrieving a completion response generated in response to the first processing of the one of the plurality of single electronic financial transactions; and
  said server for sending the retrieved completion response from the server to the conversion service.

15. The system according to claim 13, further comprising:
  means for receiving a completion response for each processed electronic transaction from the plurality of electronic transactions; and
  means for responsive to receiving completion responses for all of the electronic transactions in the plurality of electronic transactions, returning a batch completion response to the client indicating that the batch request has been processed.

16. The system according to claim 13, further comprising:
  responsive to a determination that the batch request was previously processed, means for retrieving a saved batch completion response and returning it to the client, wherein the batch completion response indicates that the batch request has been processed.

17. The system according to claim 13, wherein the means for determining the processing status of the batch request further comprises:
  means for extracting a unique batch identification from the batch request; and
  means for comparing the batch identification to a file of other batch identifications of previously processed batch requests.

18. The system according to claim 13, a conversion service for receiving an electronic financial transaction that adheres to the OFX financial transaction protocol;
  the conversion service for converting the OFX protocol transaction into a plurality of separate, single electronic transactions that each adhere to the Gold financial transaction protocol;
  the conversion service for sending the plurality of separate Gold protocol transactions to a server for processing by the server; and
  providing means for providing error processing between the OFX protocol and the Gold protocol when processing of said OFX transaction was previously started by the server but aborted prior to completion.

* * * * *

UNITED STATES PATENT AND TRADEMARK OFFICE
CERTIFICATE OF CORRECTION

PATENT NO. : 6,799,166 B2
DATED : September 28, 2004
INVENTOR(S) : Dorrance et al.

It is certified that error appears in the above-identified patent and that said Letters Patent is hereby corrected as shown below:

<u>Title page,</u>
Item [74], *Attorney, Agent, or Firm*, delete "David A. Nims, Jr." and insert
-- David A. Mims, Jr. --.

Signed and Sealed this

Thirteenth Day of September, 2005

JON W. DUDAS
*Director of the United States Patent and Trademark Office*